US012670178B2

(12) United States Patent
Shreedharan

(10) Patent No.: US 12,670,178 B2
(45) Date of Patent: Jun. 30, 2026

(54) DATA DRIFT HANDLING

(71) Applicant: StreamSets, Inc., San Mateo, CA (US)

(72) Inventor: Hari Shreedharan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 18/126,815

(22) Filed: Mar. 27, 2023

(65) Prior Publication Data

US 2023/0237066 A1    Jul. 27, 2023

Related U.S. Application Data

(63) Continuation of application No. 16/881,761, filed on May 22, 2020, now Pat. No. 11,630,840.

(51) Int. Cl.
G06F 16/27    (2019.01)
G06F 16/21    (2019.01)

(52) U.S. Cl.
CPC ............ G06F 16/27 (2019.01); G06F 16/213 (2019.01)

(58) Field of Classification Search
CPC .... G06F 16/27; G06F 16/213; G06F 16/2423; G06F 16/211
See application file for complete search history.

(56) References Cited

U.S. PATENT DOCUMENTS

| | | |
|---|---|---|
| 10,997,036 B1 | 5/2021 | Chopra et al. |
| 2005/0021502 A1 | 1/2005 | Chen et al. |

| | | | |
|---|---|---|---|
| 2008/0137618 A1 | 6/2008 | Sung et al. | |
| 2011/0013850 A1 | 1/2011 | Wang et al. | |
| 2013/0227573 A1 | 8/2013 | Morsi et al. | |
| 2014/0164078 A1 | 6/2014 | Craner et al. | |
| 2016/0020992 A1* | 1/2016 | Wu ..................... | H04L 49/3009 |
| | | | 709/212 |
| 2016/0098037 A1* | 4/2016 | Zornio ................. | H04L 43/045 |
| | | | 700/20 |
| 2017/0109259 A1* | 4/2017 | Lewis ................. | G06F 11/3006 |
| 2017/0308800 A1 | 10/2017 | Cichon et al. | |
| 2018/0302493 A1* | 10/2018 | Borkar ................. | H04L 67/565 |
| 2019/0243836 A1* | 8/2019 | Nanda .................. | G06F 16/288 |
| 2019/0286736 A1* | 9/2019 | Sturtivant ........... | G06F 16/2358 |
| 2019/0354443 A1* | 11/2019 | Haustein ............. | G06F 11/1451 |

(Continued)

OTHER PUBLICATIONS

"U.S. Appl. No. 16/881,761, Final Office Action mailed Jun. 7, 2022", 25 pgs.

(Continued)

*Primary Examiner* — Amy Ng
*Assistant Examiner* — Dustin D Eyers
(74) *Attorney, Agent, or Firm* — Cantor Colburn LLP; Stephen Yoder

(57) ABSTRACT

Systems and methods herein describe embodiments for handling a data drift. An example system accesses the data pipeline, which is comprised of a plurality of stages. For each stage of the plurality of stages in the data pipeline, the system identifies stage schema fields for processing data in the data pipeline and generates a set of stage schema fields comprising the identified stage schema fields in the stage. In response to detecting an origin stage, the system generates a set of pipeline schema fields, whereby the set of pipeline schema fields comprise a union of the generated sets of stage schema fields. The set of pipeline schema fields are then stored.

17 Claims, 4 Drawing Sheets

(56)         References Cited

U.S. PATENT DOCUMENTS

2020/0012647 A1 *    1/2020    Johnson, III .......... G06F 16/221
2021/0365475 A1    11/2021    Shreedharan

OTHER PUBLICATIONS

"U.S. Appl. No. 16/881,761, Non Final Office Action mailed Sep. 17, 2021", 25 pgs.
"U.S. Appl. No. 16/881,761, Notice of Allowance mailed Dec. 14, 2022", 10 pgs.
"U.S. Appl. No. 16/881,761, Response filed Feb. 17, 2022 to Non Final Office Action mailed Sep. 17, 2021", 10 pgs.
"U.S. Appl. No. 16/881,761, Response filed Oct. 7, 2022 to Final Office Action mailed Jun. 7, 2022", 9 pgs.

* cited by examiner

300

| | |
|---|---|
| ACCESS THE DATA PIPELINE | 302 |
| IDENTIFY STAGE SCHEMA FIELDS IN THE DATA PIPELINE | 304 |
| GENERATE A SET OF STAGE SCHEMA FIELDS COMPRISING THE IDENTIFIED STAGE SCHEMA FIELDS IN THE STAGE | 306 |
| GENERATE A SET OF PIPELINE SCHEMA FIELDS | 308 |
| STORE THE SET OF PIPELINE SCHEMA FIELDS | 310 |

DATA DRIFT HANDLING

CLAIM OF PRIORITY

This application is a continuation of U.S. patent application Ser. No. 16/881,761, filed May 22, 2020, which is incorporated by reference herein in its entirety

TECHNICAL FIELD

Embodiments of the present disclosure generally relate to data synchronization. More particularly, but not by way of limitation, the present disclosure addresses systems and methods for handling data drift in a data pipeline.

BACKGROUND

A database schema refers to the organization of data as a blueprint of how the database is constructed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
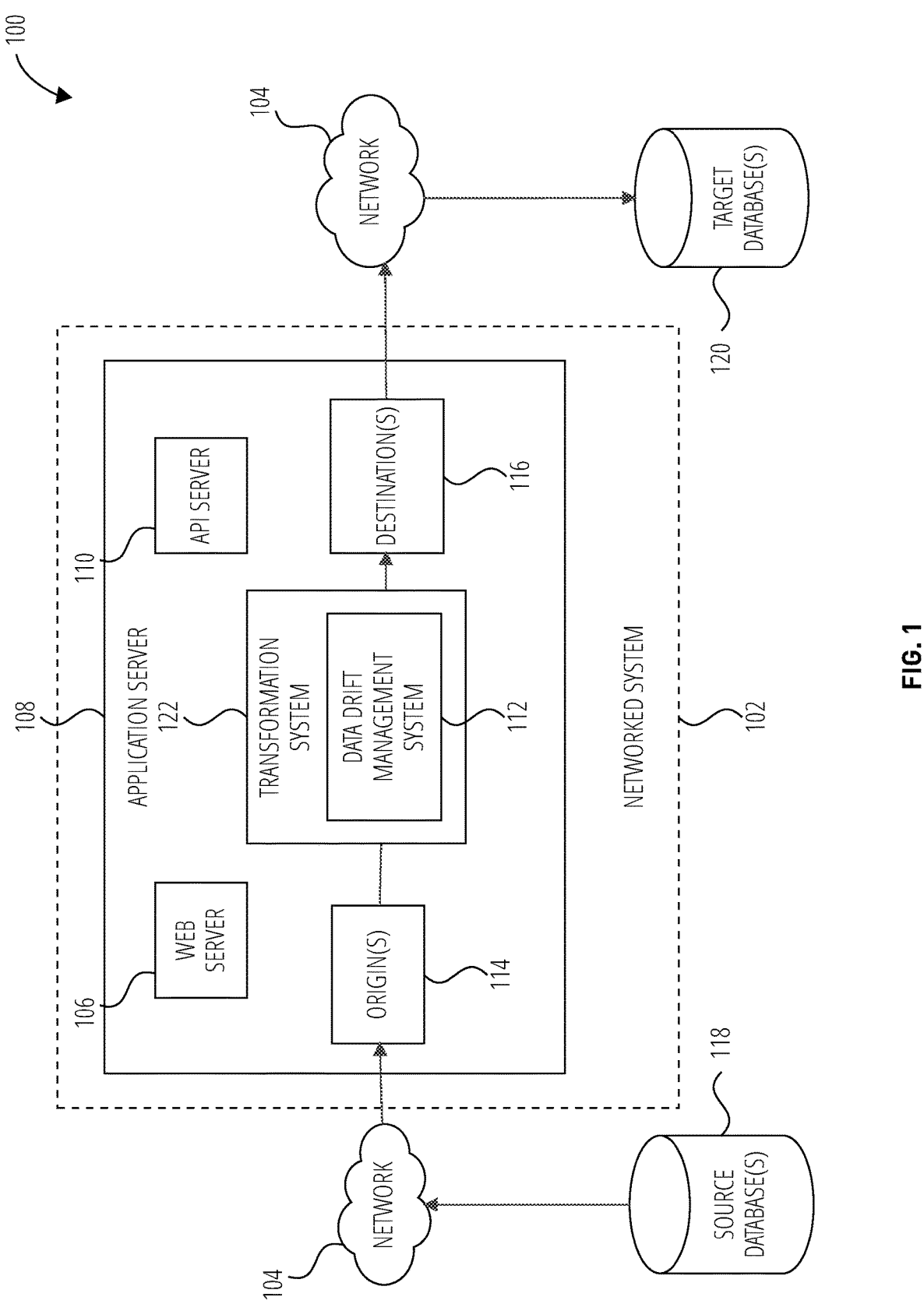
FIG. 1 is a network diagram depicting a computer system within which a data drift management system may be deployed, according to some embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for handling data drift in a data pipeline. In some embodiments, a data pipeline describes a flow of data from origin systems to destination systems and defines how to transform the data along the way. An origin is a data connecter (e.g., computer software) that can be used to access data from a data source. A destination, in contrast, writes data to a specified location.

Each data pipeline may comprise two or more distinct points, also referred to as stages. Each data pipeline has an origin stage. The data in the data pipeline can be processed in multiple ways before it reaches the destination(s). As such, there are multiple processor stages to transform the data and resultant data can be written to multiple locations (e.g., destination stages).

There are three types of stages: origin stage, processor stage, and destination stage. Origin stages are stages that read data from data sources (e.g., other data systems). Processor stages are stages that apply some form of processing (e.g., receives input data and produces output data). Example processing tasks include extract, transform, load (ETL) procedures, stream processing, and machine learning operations. Destination stages are stages that write data out into destinations.

In some embodiments, a transformation system may be configured to run data pipelines on a cluster-computing framework. The data pipelines can perform transformations that require heavy processing on the entire data set. The transformation execution engine may be installed on a machine that is configured to submit computation tasks to a computer cluster (e.g., a group of inter-connected computers that work together to perform computationally intensive tasks). A user may utilize a web browser to access a control interface which may be used to design and run the data pipelines. The transformation execution engine submits the data pipelines as a job to the cluster.

In some embodiments, a user-interface system accesses a data pipeline from a web-based platform. The web-based platform may be part of the transformation system. The data pipeline comprises a series of data operations related to a set of data. For example, the data operations may include receiving the set of data from data sources, processing the set of data by applying data transformations on the set of data, and writing the processed set of data out to destinations. A user of a computing device can configure the data pipeline from the web-based platform. For example, a user can configure the data pipeline to read from specified data sources, configure the schema fields for the data pipeline, and can specify the various operations to be performed on the data before writing the processed data out to destinations.

Unexpected, unannounced, and unending changes to data constantly disrupt data flow. This may be referred to as data drift. Data drift is the unpredictable and continuous mutation of data characteristics caused by operations, maintenance, and modernization of systems producing the data. It is a by-product of the decoupled and decentralized nature of modern data infrastructure. For example, most data-producing applications operate independently, going through their own private lifecycle of changes and releases.

There are three types of data drift in modern systems; structural drift, sematic drift, and infrastructure drift. Structural drift, also known as schema evolution, describes changes to the data such as, but not limited to: additions to the data attributes, changes to the structure of existing attributes to accommodate new requirements, dropping of existing attributes, or incompatible changes in the representation of existing attributes. Semantic drift describes changes to the data where the meaning attributed to the data changes, rendering the data interpretations previously understood by consuming applications no longer applicable. Infrastructure drift relates to changes in the underlying producing, consuming or operating systems.

If systems designed to move data do not take data drift into account, they can fail and become a bottleneck to data operations. Thus, example embodiments ensure continuous data flows by automatically identifying and handling data drift.

Systems and methods are described below for handling data drift. In some embodiments, the systems and methods can handle schema field changes that are additive (e.g., adding new columns of data). The transformation system uses the data pipeline configuration to calculate a minimum set of schema fields the incoming data must contain based on the operations in the data pipeline. The transformation system accesses a data pipeline comprising multiple stages (e.g., origin stage, processor stages, and destination stages). Starting from the destination stages, the transformation works backward by analyzing each stage in the data pipeline. For each stage, the transformation system identifies stage schema fields for processing the data in the data pipeline. The transformation system stores the identified stage schema fields in a set. This process is continued for each path in the data pipeline until reaching the origin stage. Eventually, when the system reaches the origin stage, the system calculates a union of all the generated sets that are generated along the various paths in the data pipeline that the data from this origin travels through. The union of these sets represents the pipeline schema fields required for the data pipeline to function without error. The transformation system stores the pipeline schema fields.

FIG. 1 is a diagram illustrating a network environment 100 suitable for handling data drift within a data pipeline, in accordance with example embodiments. The network environment 100 includes a networked system 102 communicatively coupled via a network 104 to a database (e.g., source database(s) 118, target database(s) 120). In example embodiments, the networked system 102 comprises components that perform data synchronization to ensure continuous data flows by automatically identifying and handling data drift. The components of the networked system 102 are described in more detail in connection with FIG. 2 and may be implemented in a computer system, as described below with respect to FIG. 4

FIG. 1 illustrates, for example, a data pipeline with origin(s) 114 and destination(s) 116, and a transformation system 122. The origin(s) 114 may be configured to connect to source database(s) 118 via the network 104. The transformation system 122 receives data from the origin(s) 114 and performs one or more transformation operations on the data. The transformation system 122 submits the transformed data to the destination(s) 116. In example embodiments, the transformation system 122 includes a data drift management system 112. The data drift management system 112 is configured to perform data synchronization to ensure continuous data flows by automatically identifying and handling data drift The networked system 102 provides server-side functionality via the network 104 (e.g., the Internet or Wide Area Network (WAN)) to one or more data storage systems. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

An Application Program Interface (API) server 110 and a web server 106 are coupled to, and provide programmatic and web interfaces respectively to, an application server 108. The application server 108 hosts the transformation system 122. The transformation system 122 may thus facilitate data transformations and provide a user-interface for the creation and distribution of computer applications using the data drift management system 112. The application server 108, in turn, may be coupled to a database server (not shown) that facilitates access to source database(s) 118 and target database(s) 120 in some embodiments.

While the transformation system 122 is shown in FIG. 1 to form part of the networked system 102, it will be appreciated that, in alternative embodiments, the transformation system 122 may form part of a service that is separate and distinct from the networked system 102. Similarly, while the data drift management system 112 is shown to form part of the networked system 102, it will be appreciated that, in alternative embodiments, the data drift management system 112 may form part of a service that is separate and distinct from the networked system 102.

Further, the network environment 100 is, of course, not limited to such an architecture as shown in FIG. 1. Additionally, any portion or portions of the transformation system 122 and the data drift management system 112 may reside and be executed from any kind of computing device. The transformation system 122 and the data drift management system 112 can also be implemented as standalone software program(s), which does not necessarily have networking capabilities.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 4, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 2:
FIG. 2 is a block diagram of a data drift management system, according to some example embodiments.
Figure 2:
Figure 2:
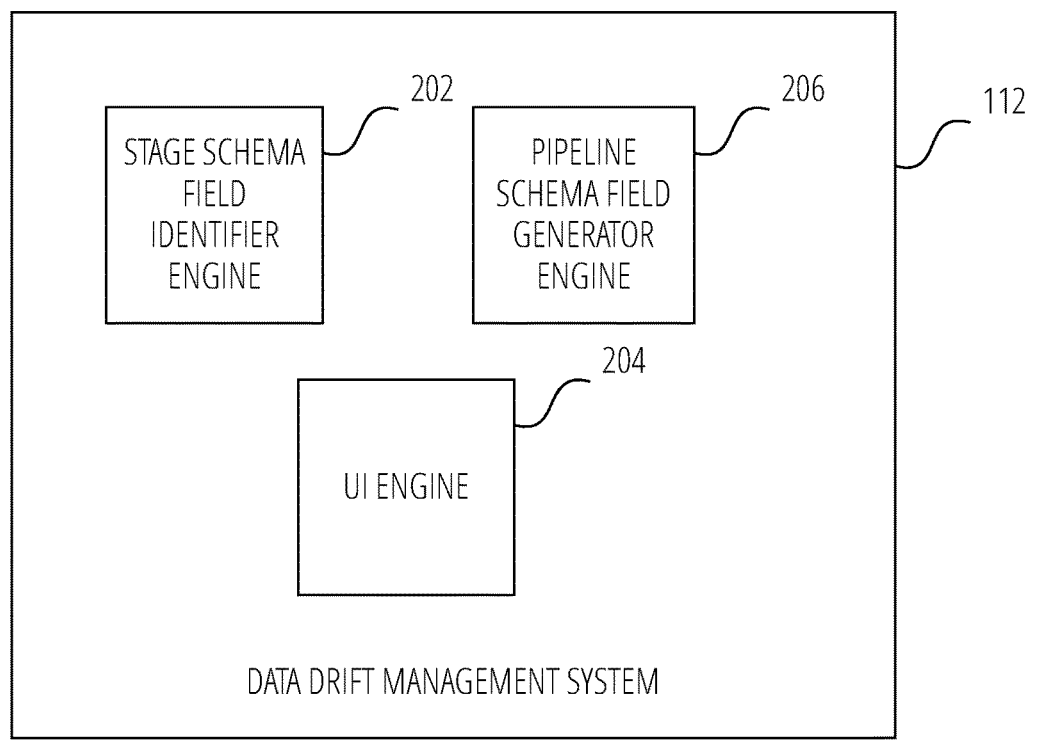

FIG. 2 is a block diagram 200 showing components of the data drift management system 112, according to some example embodiments. The data drift management system 112 is configured to perform data synchronization to ensure continuous data flows by automatically identifying and handling data drift. To enable these operations, the data drift management system 112 comprises a stage schema field identifier engine 202, a user interface (UI) engine 204, and a pipeline schema field generator engine 206.

The stage schema field identifier engine 202 processes each stage from the destination(s) 116 to the origin(s) 114. For each stage, the stage schema field identifier engine 202 identifies the schema fields that are used for processing data in the data pipeline and stores the schema fields in a set, S. If one of the schema fields, F, in S is generated by a stage, F is replaced in S by the fields required by that stage. The stage schema field identifier engine 202 continues this process for each path in the data pipeline, until it reaches the origin(s) 114. For example, each stage can read inputs from one or more stages. When the stage schema field identifier engine 202 works backwards through the data pipeline and reaches a stage that receives more than one input, the path is split when going backwards from that stage. That is, there is more than one path to traverse (e.g., one path for each input to such a stage).

Once the stage schema field identifier engine 202 reaches an origin stage, the pipeline schema field generator engine 206 generates a pipeline schema set. The pipeline schema set represents a minimum set of schema fields required by the origin(s) 114. For example, the pipeline schema set is a union of the sets S that are generated along the various paths in the data pipeline that the data from this origin(s) 114 travels through.

The UI engine 204 causes presentation of the data pipeline on a graphical user interface of a computing device. The UI engine 204 may also display graphs, charts, or other visualization of the data within the data pipeline. The UI engine 204 may further display configuration attributes of the data pipeline. For example, the UI engine 204 provides a user interface that allow a user of a computing device to generate a fixed set of schema fields that are required for the data pipeline to function without error. The UI engine 204 receives user input, via the user interface from the computing device, that represent the minimum set of schema fields required by the origin(s) 114. Furthermore, the UI engine 204 may dynamically update the graphical user interface in real-time or near real-time as the data is moving through the data pipeline.

Figure 3:
FIG. 3 is a flowchart of an example method for handling data drift in a data pipeline in accordance with one embodiment.
Figure 3:
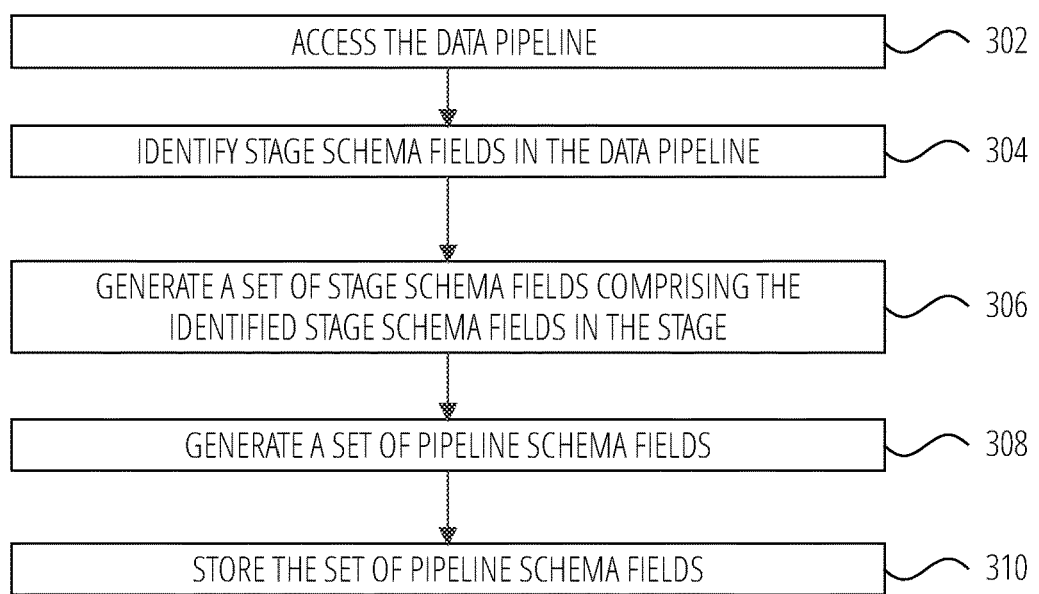

FIG. 3 is a flowchart of an example method 300 for managing data drift in a data pipeline, according to some example embodiments. Operations in the method 300 are performed by the networked system 102, using components described above with respect to FIG. 1 and FIG. 2. Accordingly, the method 300 is described by way of example with reference to the networked system 102. However, it shall be appreciated that at least some of the operations of the method 300 may be deployed on various other hardware configurations or be performed by similar components residing elsewhere in the network environment 100. Therefore, the method 300 is not intended to be limited to the networked system 102.

In some embodiments, the method 300 is performed to ensure incoming data to the data pipeline has the minimum required schema fields for the data pipeline. For example, the method 300 is performed before the data in the data pipeline is read, processed, and written to the destination(s) 116.

In operation 302 the data drift, management system 112 accesses the data pipeline. The data pipeline comprises a plurality of stages (e.g., origin stage, processor stage, destination stage). In some embodiments, operation 302 is performed by the stage schema field identifier engine 202.

For each stage of the plurality of stages in the data pipeline, the data drift management system 112 performs operations 304 and 306. At operation 304, the data drift management system 112 identifies stage schema fields for processing data in the data pipeline.

At operation 306, the data drift management system 112 generates a set of stage schema fields comprising the identified stage schema fields in the stage. The data drift management system 112 performs operations 304 and 306 by visiting each stage starting from the destination(s) 116 until it reaches an origin(s) 114. In some embodiments, operations 304 and 306 are performed by the stage schema field identifier engine 202.

Once the data drift management system 112 detects an origin stage, the data drift management system 112, at operation 308, generates a set of pipeline schema fields. For example, the set of pipeline schema fields comprises a union of each of the generated sets of stage schema fields generated at operation 306. For example, assume a data pipeline has two stages: Stage 1 and Stage 2. Stage 1 has a set of stage schema fields: {A, B}. Stage 2 has a set of stage schema fields: {C, D}. The set of pipeline schema fields are generated by calculating the union of Stage 1 and Stage 2. Thus, the set of pipeline schema fields includes {A, B, C, D}. In some embodiments, operation 308 is performed by the pipeline schema field generator engine 206.

At operation 310, the data drift management system 112 stores the set of pipeline schema fields. In some embodiments, the set of pipeline schema fields is stored as offset information. The offset information provides information on how to restart the data pipeline from a last batch of data that was processed. Each origin(s) 114 stores the pipeline schema fields (e.g., the set of pipeline schema fields) into the offset information. On each new batch, the origin(s) 114 updates the schema fields for the data pipeline if required. Once the schema, fields are updated, the updated schema field is persisted to the offset information so that new batches of data can handle the updated schema fields even on restart of a data pipeline job and/or the transformation system 122 itself.

In some embodiments, the schema fields for the data pipeline are updated based on the set of pipeline schema fields. For example once the set of pipeline schema fields are determined, that information is associated with the data pipeline.

In some embodiments, the data drift management system 112 receives user input indicating minimum required schema fields for the data pipeline. For example, the user input indicates a fixed set of schema fields for the pipeline to function without error. Before reading a new batch of data, the data drift management system 112 compares the schema fields of the actual incoming data (e.g., the set of pipeline schema fields generated by the pipeline schema field generator engine 206) to the minimum required schema fields indicated by the user. In some embodiments, the UI engine 204 receives the user input indicating the fixed set of schema fields.

In some embodiments, after the data drift management system 112 generates the set of pipeline schema fields and stores the set of pipeline schema fields, the data drift management system 112 compares data in the pipeline to the set of pipeline schema fields. If the data in the pipeline is compatible with the set of pipeline schema fields (e.g., the schema fields of the data in the pipeline match the set of pipeline schema fields), the data drift management system 112 reads data from the origin(s) 114, processes (e.g., transforms) the data according to the schema fields in the pipeline, and writes the processed data to destination(s) 116.

In some embodiments, the data drift management system 112 detects a data pipeline failure. The data drift management system 112 compares the data in the data pipeline to the set of pipeline schema fields and detects that at least one pipeline schema field in the set of pipeline schema fields is not detected in the data in the data pipeline. For example, a data pipeline failure may indicate that the data being read from the origin(s) 114 does not contain all the fields specified by the set of pipeline fields. In response to detecting the data pipeline failure, the data drift management system 112 writes the failed batch of data to a different location (e.g., external storage or any other persistent storage system) for analysis. The analysis may include identifying the data that caused the failure or determining why the schema fields for the incoming data was incorrect. This may be performed by running diagnostic software that matches the schema fields against the incoming data or by using custom applications to identify and remove the data causing the data pipeline failure.

Figure 4:
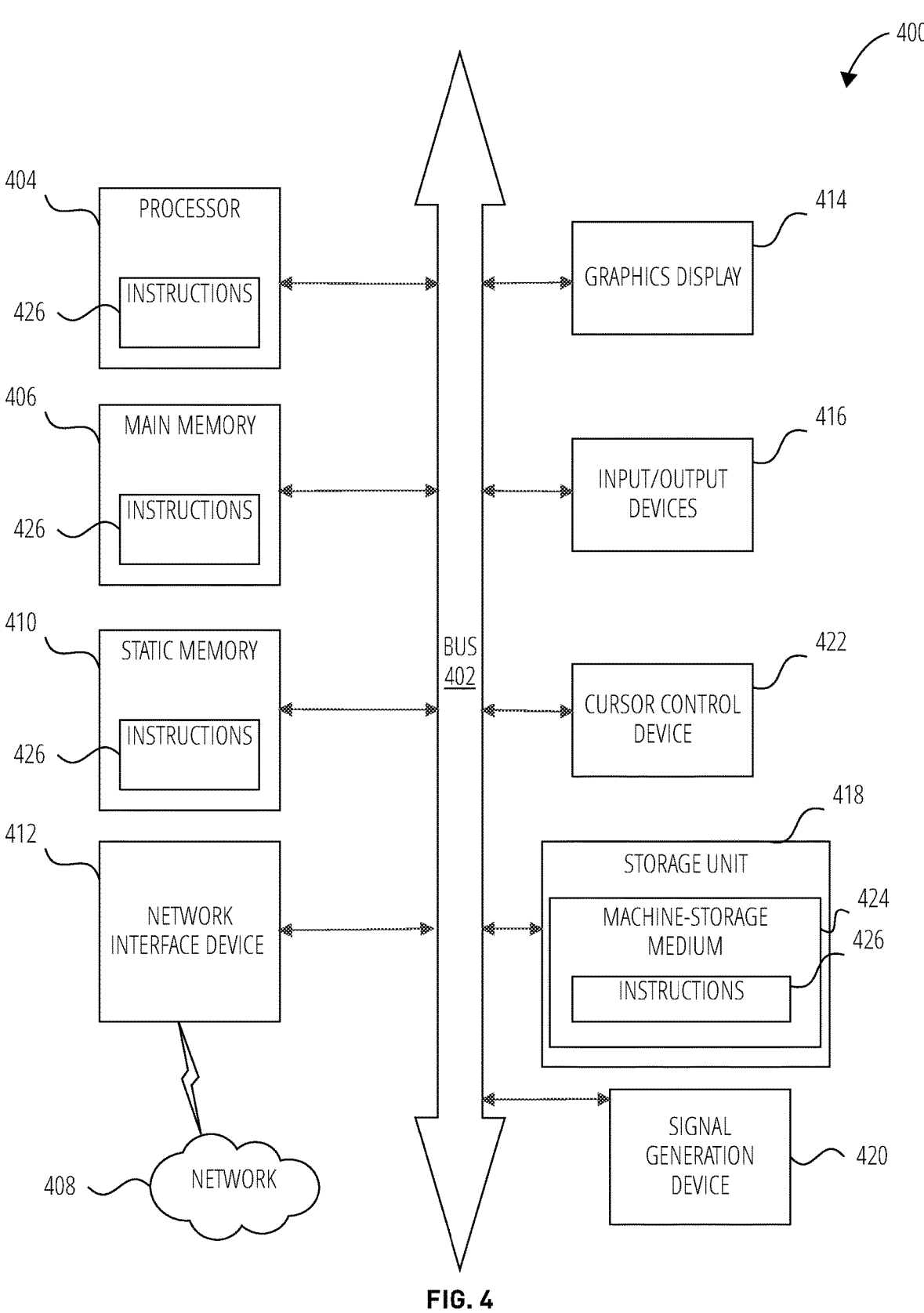
FIG. 4 shows a diagrammatic representation of a machine in the example form of a computer system within which a set of instructions, for causing the machine to perform any one or more of the methodologies discussed herein, may be executed, according to some example embodiments.

FIG. 4 illustrates components of a machine 400, according to some example embodiments, that is able to read instructions from a machine-storage medium (e.g., a machine-readable storage device, a non-transitory machine-readable storage medium, a computer-readable storage medium, or any suitable combination thereof) and perform any one or more of the methodologies discussed herein. Specifically, FIG. 4 shows a diagrammatic representation of the machine 400 in the example form of a computer device (e.g., a computer) and within which instructions 426 (e.g., software, a program, an application, an applet, an app, or other executable code) for causing the machine 400 to perform any one or more of the methodologies discussed herein may be executed, in whole or in part.

For example, the instructions 426 may cause the machine 400 to execute the flow diagrams of FIG. 3. In one embodiment, the instructions 426 can transform the general, non-programmed machine 400 into a particular machine (e.g., specially configured machine) programmed to carry out the described and illustrated functions in the manner described.

In alternative embodiments, the machine 400 operates as a standalone device or may be connected (e.g., networked) to other machines. In a networked deployment, the machine 400 may operate in the capacity of a server machine or a client machine in a server-client network environment, or as a peer machine in a peer-to-peer (or distributed) network environment. The machine 400 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 426 (sequentially or otherwise) that specify actions to be taken by that machine. Further, while only a single machine is illustrated, the term "machine" shall also be taken to include a collection of machines that individually or jointly execute the instructions 426 to perform any one or more of the methodologies discussed herein.

The machine 400 includes a processor 404 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 406, and a static memory 410, which are configured to communicate with each other via a bus 402. The processor

404 may contain microcircuits that are configurable, temporarily or permanently, by some or all of the instructions 426 such that the processor 404 is configurable to perform any one or more of the methodologies described herein, in whole or in part. For example, a set of one or more microcircuits of the processor 404 may be configurable to execute one or more modules (e.g., software modules) described herein.

The machine 400 may further include a graphics display 414 (e.g., a plasma display panel (PDP), a light emitting diode (LED) display, a liquid crystal display (LCD), a projector, or a cathode ray tube (CRT), or any other display capable of displaying graphics or video). The machine 400 may also include an input device 416 (e.g., a keyboard), a cursor control device 422 (e.g., a mouse, a touchpad, a trackball, a joystick, a motion sensor, or other pointing instrument), a storage unit 418, a signal generation device 420 (e.g., a sound card, an amplifier, a speaker, a headphone jack, or any suitable combination thereof), and a network interface device 412.

The storage unit 418 includes a machine-storage medium 424 (e.g., a tangible machine-readable storage medium) on which is stored the instructions 426 (e.g., software) embodying any one or more of the methodologies or functions described herein. The instructions 426 may also reside, completely or at least partially, within the main memory 406, within the processor 404 (e.g., within the processor's cache memory), or both, before or during execution thereof by the machine 400. Accordingly, the main memory 406 and the processor 404 may be considered as machine-readable media (e.g., tangible and non-transitory machine-readable media). The instructions 426 may be transmitted or received over a network 408 via the network interface device 420.

In some example embodiments, the machine 400 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 406, 410, and/or memory of the processor 404) and/or storage unit 418 may store one or more sets of instructions and data structures (e.g., software) embodying or utilized by any one or more of the methodologies or functions described herein. These instructions, when executed by processor(s) 404 cause various operations to implement the disclosed embodiments.

As used herein, the terms "machine-storage medium," "device-storage medium," "computer-storage medium" (referred to collectively as "machine-storage medium 424") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 424 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 424 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 426 may further be transmitted or received over a communications network 426 using a transmission medium via the network interface device 412 and utilizing any one of a number of well-known transfer protocols (e.g., HTTP). Examples of communication networks 408 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 426 for execution by the machine 400, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art, Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
accessing, using one or more processors, a data pipeline, the data pipeline comprising a plurality of stages, wherein the data pipeline is executed on a cluster-computing framework comprising a group of interconnected computers that work together to perform computationally intensive tasks;
receiving a fixed set of schema fields for the data pipeline to function without error;
for each stage of the plurality of stages in the data pipeline starting from one or more destination stages and traversing backward through the data pipeline until reaching an origin stage:
identifying schema fields for processing data in the data pipeline; and
generating a set of stage schema fields comprising the identified stage schema fields in the stage;
in response to detecting the origin stage, generating a set of pipeline schema fields, the set of pipeline schema fields comprising a union of the generated sets of stage schema fields, the union of the generated sets of stage schema fields representing pipeline schema fields required for the data pipeline to function without error, storing the set of pipeline schema fields;

comparing the set of pipeline schema fields to the fixed set of schema fields;

comparing data in the data pipeline to the set of pipeline schema fields;

in response to detecting that the set of pipeline schema fields is compatible with the data in the data pipeline, writing the data to a first target destination, wherein the first target destination is configured to store data that meets the compatibility requirements of the fixed set of schema fields and is intended for further processing or use in downstream applications;

in response to detecting that the data in the data pipeline corresponding to at least one pipeline schema field in the set of pipeline schema fields does not include all of the fields of data specified by the at least one pipeline schema field, writing the data to a second target location, wherein the second target location is configured to store data that does not meet the compatibility requirements of the fixed set of schema fields and is intended for diagnostic or corrective actions to address schema incompatibilities; and removing the data in the second target location from the data pipeline.

2. The method of claim 1, wherein the set of pipeline schema fields represents minimum required schema fields for the data pipeline.

3. The method of claim 1, further comprising:

updating schema fields for the data pipeline based on the set of pipeline schema fields.

4. The method of claim 3, wherein the set of pipeline schema fields are stored as offset information, the offset information providing information on how to restart the data pipeline from a last batch of data that was processed.

5. The method of claim 1, further comprising:

in response to detecting that the set of pipeline schema fields is compatible with the data in the data pipeline:

reading the data in the data pipeline; and processing the data based the set of pipeline schema fields, wherein the processing occurs at the first target destination configured for downstream applications.

6. The method of claim 1, further comprising:

in response to detecting that at least one pipeline schema field in the set of pipeline schema fields is not detected in the data in the data pipeline, detecting a failure in the data pipeline; and wherein the second target location is a database configured to store data for diagnostic or corrective actions to address schema incompatibilities.

7. A system comprising:

one or more processors; and a memory storing instructions that, when executed by the one or more processors, cause the one or more processors to perform operations comprising:

accessing a data pipeline, the data pipeline comprising a plurality of stages, wherein the data pipeline is executed on a cluster-computing framework comprising a group of inter-connected computers that work together to perform computationally intensive tasks;

receiving a fixed set of schema fields for the data pipeline to function without error;

for each stage of the plurality of stages in the data pipeline starting from one or more destination stages and traversing backward through the data pipeline until reaching an origin stage:

identifying stage schema fields for processing data in the data pipeline; and generating a set of stage schema fields comprising the identified stage schema fields in the stage;

in response to detecting the origin stage, generating a set of pipeline schema fields, the set of pipeline schema fields comprising a union of the generated sets of stage schema fields, the union of the generated sets of stage schema fields representing pipeline schema fields required for the data pipeline to function without error;

storing the set of pipeline schema fields;

comparing the set of pipeline schema fields to the fixed set of schema fields; and comparing data in the data pipeline to the set of pipeline schema fields;

in response to detecting that the set of pipeline schema fields is compatible with the data in the data pipeline, writing the data to a first target destination, wherein the first target destination is configured to store data that meets the compatibility requirements of the fixed set of schema fields and is intended for further processing or use in downstream applications;

in response to detecting that the data in the data pipeline corresponding to at least one pipeline schema field in the set of pipeline schema fields does not include all of the fields of data specified by the at least one pipeline schema field, writing the data to a second target location, wherein the second target location is configured to store data that does not meet the compatibility requirements of the fixed set of schema fields and is intended for diagnostic or corrective actions to address schema incompatibilities; and removing the data in the second target location from the data pipeline.

8. The system of claim 7, wherein the set of pipeline schema fields represents a minimum required schema fields for the data pipeline.

9. The system of claim 7, wherein the operations further comprise:

updating schema fields for the data pipeline based on the set of pipeline schema fields.

10. The system of claim 9, wherein the set of pipeline schema fields are stored as offset information, the offset information providing information on how to restart the data pipeline from a last batch of data that was processed.

11. The system of claim 7, wherein the operations further comprise:

in response to detecting that the set of pipeline schema fields is compatible with the data in the data pipeline:

reading the data in the data pipeline; and processing the data based the set of pipeline schema fields, wherein the processing occurs at the first target destination configured for downstream applications.

12. The system of claim 7, wherein the operations further comprise:

in response to detecting that at least one pipeline schema field in the set of pipeline schema fields is not detected in the data in the data pipeline, detecting a failure in the data pipeline; and wherein the second target location is a database configured to store data for diagnostic or corrective actions to address schema incompatibilities.

13. A non-transitory machine storage medium storing instructions that when executed by one or more processors of a machine, cause the machine to perform operations comprising:

accessing a data pipeline, the data pipeline comprising a plurality of stages, wherein the data pipeline is executed on a cluster-computing framework comprising a group of inter-connected computers that work together to perform computationally intensive tasks;

receiving a fixed set of schema fields for the data pipeline to function without error;

for each stage of the plurality of stages in the data pipeline starting from one or more destination stages and traversing backward through the data pipeline until reaching an origin stage:

identifying stage schema fields for processing data in the data pipeline; and generating a set of stage schema fields comprising the identified stage schema fields in the stage;

in response to detecting the origin stage, generating a set of pipeline schema fields, the set of pipeline schema fields comprising a union of the generated sets of stage schema fields, the union of the generated sets of stage schema fields representing pipeline schema fields required for the data pipeline to function without error;

storing the set of pipeline schema fields;

comparing the set of pipeline schema fields to the fixed set of schema fields; and comparing data in the data pipeline to the set of pipeline schema fields;

in response to detecting that the set of pipeline schema fields is compatible with the data in the data pipeline, writing the data to a first target destination, wherein the first target destination is configured to store data that meets the compatibility requirements of the fixed set of schema fields and is intended for further processing or use in downstream applications;

in response to detecting that the data in the data pipeline corresponding to at least one pipeline schema field in the set of pipeline schema fields does not include all of the fields of data specified by the at least one pipeline schema field, writing the data to a second target location, wherein the second target location is configured to store data that does not meet the compatibility requirements of the fixed set of schema fields and is intended for diagnostic or corrective actions to address schema incompatibilities; and removing the data in the second target location from the data pipeline.

14. The non-transitory machine storage medium of claim 13, wherein the set of pipeline schema fields represents minimum required schema fields for the data pipeline.

15. The non-transitory machine storage medium of claim 13, wherein the operations further comprise:

updating schema fields for the data pipeline based on the set of pipeline schema fields.

16. The non-transitory machine storage medium of claim 15, wherein the set of pipeline schema fields are stored as offset information, the offset information providing information on how to restart the data pipeline from a last batch of data that was processed.

17. The non-transitory machine storage medium of claim 13, wherein the operations further comprise:

in response to detecting that at least one pipeline schema field in the set of pipeline schema fields is not detected in the data in the data pipeline, detecting a failure in the data pipeline; and wherein the second target location is a database configured to store data for diagnostic or corrective actions to address schema incompatibilities.

* * * * *